(12) United States Patent
Lancaster (10) Patent No.: US 12,179,654 B2
(45) Date of Patent: Dec. 31, 2024

(54) RV SLIDING MATTRESS DECK ACCESSORY

(71) Applicant: Thomas Lancaster, Federal Way, WA (US)

(72) Inventor: Thomas Lancaster, Federal Way, WA (US)

(*) Notice: Subject to any disclaimer, the term of this patent is extended or adjusted under 35 U.S.C. 154(b) by 322 days.

(21) Appl. No.: 17/679,638

(22) Filed: Feb. 24, 2022

(65) Prior Publication Data

US 2022/0266737 A1   Aug. 25, 2022

Related U.S. Application Data

(60) Provisional application No. 63/153,120, filed on Feb. 24, 2021.

(51) Int. Cl.
| | |
|---|---|
| *B60P 3/39* | (2006.01) |
| *A47C 17/46* | (2006.01) |
| *A47C 17/48* | (2006.01) |
| *A47C 17/52* | (2006.01) |
| *A47C 17/58* | (2006.01) |
| *A47C 17/80* | (2006.01) |
| *A47C 19/12* | (2006.01) |
| *B60N 3/00* | (2006.01) |

(Continued)

(52) U.S. Cl.
CPC .............. *B60P 3/39* (2013.01); *A47C 19/122* (2013.01); *A47C 17/46* (2013.01); *A47C 17/48* (2013.01); *A47C 17/52* (2013.01); *A47C 17/58* (2013.01); *A47C 17/80* (2013.01); *A47C 19/12* (2013.01); *B60N 3/008* (2013.01); *B60P 3/34* (2013.01); *B60P 3/38* (2013.01)

(58) Field of Classification Search
CPC ...... B60P 3/39; B60P 3/38; B60P 3/34; B60N 3/008; A47C 17/38; A47C 19/122; A47C 19/12; A47C 17/80; A47C 17/52; A47C 17/58; A47C 17/40; A47C 17/46; A47C 17/48; A47C 17/50; A61G 7/002; A61G 7/015
USPC ................................ 296/170, 169, 171, 165
See application file for complete search history.

(56) References Cited

U.S. PATENT DOCUMENTS

| | | | | |
|---|---|---|---|---|
| 2,544,762 A | * | 3/1951 | Gene ...................... | A47C 17/48 5/154 |
| 4,637,081 A | * | 1/1987 | Clark ..................... | B63B 29/04 297/65 |

(Continued)

*Primary Examiner* — Justin C Mikowski
*Assistant Examiner* — Morgan J McClure
(74) *Attorney, Agent, or Firm* — Dean A. Craine, P.S.

(57) ABSTRACT

A sliding mattress accessory is used with an existing mattress support system coupled to an RV slide-out. The accessory includes a secondary deck with a fixed head section, a long deck section and a hinge. The system also includes two long sliding rails longitudinally aligned and mounted to the secondary deck's bottom surface and the primary deck's top surface used with the existing mattress support system. The system includes at least one support mounted on the top surface of the primary deck that supports the fixed head section. The two sliding rails and the fixed support are the same height so the entire secondary deck is elevated approximately 3 inches above the primary deck. A lock mechanism prevents the secondary deck from moving longitudinally over the primary deck. When assembled, the secondary platform is aligned and registered over the primary deck, and a mattress is placed over the secondary deck.

3 Claims, 8 Drawing Sheets

(51) Int. Cl.
*B60P 3/34* (2006.01)
*B60P 3/38* (2006.01)

(56) References Cited

U.S. PATENT DOCUMENTS

| | | | | |
|---|---|---|---|---|
| 4,826,235 | A * | 5/1989 | Zwick | A47C 17/80 5/118 |
| 4,928,332 | A * | 5/1990 | Ogden | A47C 20/048 5/618 |
| 5,440,768 | A * | 8/1995 | Danin | A47C 17/60 5/4 |
| 5,794,283 | A * | 8/1998 | Vila | A47C 17/2073 5/18.1 |
| 6,134,724 | A * | 10/2000 | Brown | A47C 17/80 5/118 |
| 6,217,106 | B1 * | 4/2001 | Reckner, Jr. | B60P 3/341 5/119 |
| 6,463,603 | B1 * | 10/2002 | Camfield | A47C 17/50 5/21 |
| 6,658,798 | B1 * | 12/2003 | Frerichs | E04B 1/34305 296/26.14 |
| 6,805,391 | B2 * | 10/2004 | Schneider | B60P 3/34 74/30 |
| 6,857,689 | B2 * | 2/2005 | Dodgen | A47C 20/041 5/118 |
| 8,186,744 | B1 * | 5/2012 | Hanser | B60P 3/39 5/47 |
| 8,480,159 | B2 * | 7/2013 | Jones | B60P 3/34 296/171 |
| 8,935,816 | B1 * | 1/2015 | Sweet | B60P 3/38 5/147 |
| 9,370,245 | B2 * | 6/2016 | Fafard | A47C 1/032 |
| 9,604,564 | B1 * | 3/2017 | Pellicer | B60P 3/39 |
| 10,463,163 | B1 * | 11/2019 | Aramli | A47C 21/026 |
| 2004/0017096 | A1 * | 1/2004 | Crean | B60P 3/34 296/175 |
| 2008/0265618 | A1 * | 10/2008 | Cadena | B60P 3/34 296/175 |
| 2020/0196768 | A1 * | 6/2020 | Wesolowski | A47C 17/58 |
| 2021/0353072 | A1 * | 11/2021 | Aldrich | A47C 19/22 |
| 2022/0248861 | A1 * | 8/2022 | Shan | A47C 31/023 |
| 2023/0017194 | A1 * | 1/2023 | Slater | A47C 17/04 |

* cited by examiner

RV SLIDING MATTRESS DECK ACCESSORY

This utility patent application is based on and claims the filing date benefit of the U.S. provisional patent application (63/153,120) filed on Feb. 24, 2021.

Notice is given that the following patent document contains original material subject to copyright protection. The copyright owner has no objection to the facsimile or digital download reproduction of all or part of the patent document but otherwise reserves all copyrights.

BACKGROUND OF THE INVENTION

1. Field of the Invention

This invention pertains to bed mattress supports and, more particularly, to bed mattress supports used with an existing bed mattress support mounted in a recreational vehicle that partially extends into and moves with a recreational vehicle's slide-out.

2. Description of the Related Art

Motorized and large towable recreational vehicles (hereinafter 'RVs') often come equipped with slide-outs that extend outward from the body of the RV to increase the amount of living space in the RV significantly. The slide-out, which is usually retracted into the RV's body when moving, is coupled to a motorized or hydraulic system that allows the user to selectively extend the slide out from the body when the RV is parked. It is common to install wall cabinets, benches, tables, and beds in the slide-out that move back and forth with the slide-out. The slide-out and structure partially extend into the RV's living space when retracted into the body.

FIGS. 1-4 are illustrations of a towable RV 12 with a slide-out 14 designed to give more living space in the RV's bedroom area Inside the bedroom is a mattress support system 19 that includes an elevated frame or platform 20. Mounted on platform 20 is a primary deck 22 on which a mattress 30 is placed. Platform 20, the primary deck 22, and the mattress 30 are transverse to the RV's longitudinal axis. When assembled, the ends of platform 20, primary deck 22, and mattress 30 partially extend into the slide-out 14. The length of the slide-out 14 is usually slightly larger than the widths of the platform 20, the primary deck 22, and the mattress 30 to save space and reduce manufacturing costs.

Figure 1:
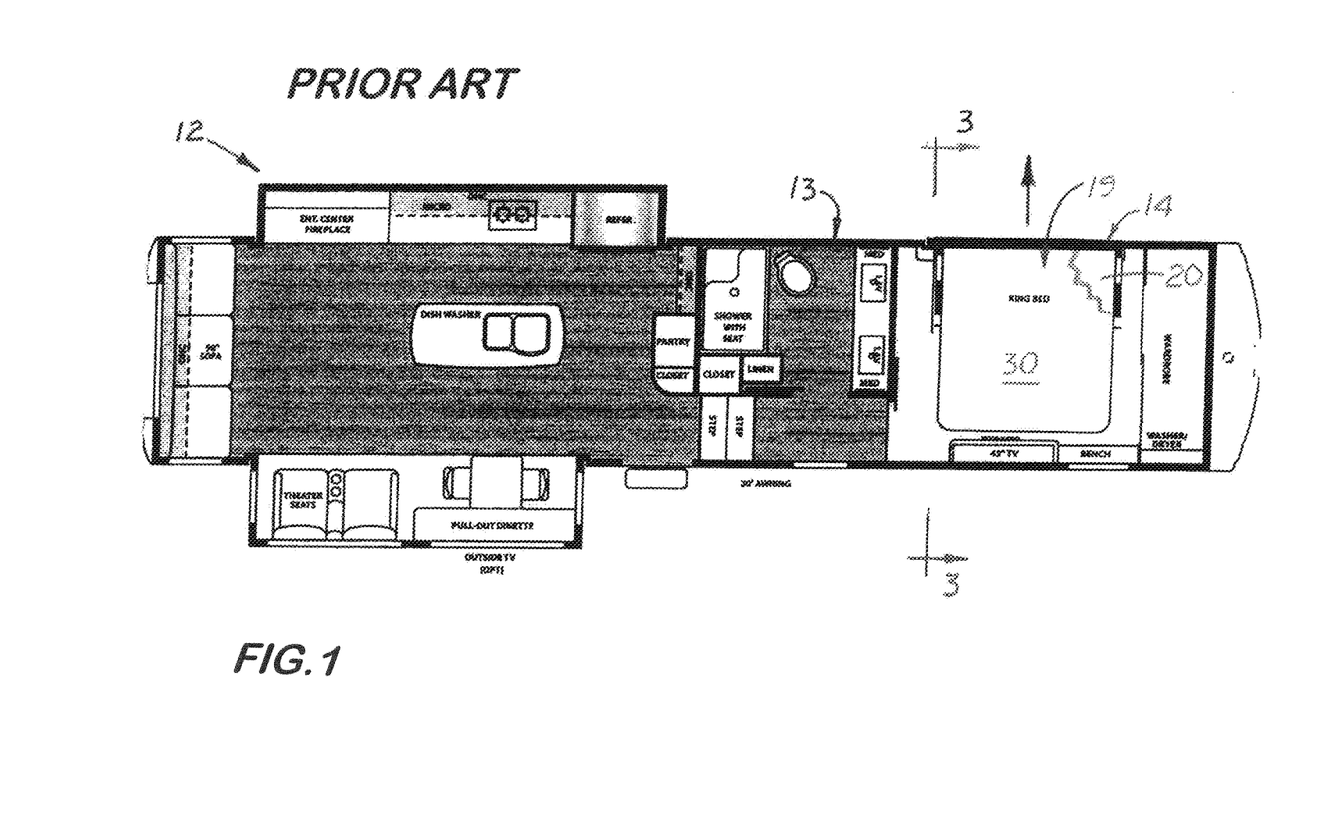
FIGS. 1-4 are illustrations of a towable RV with a slide-out coupled to a storage platform and mattress showing the slide-out being extended and retracted from the RV body.
Figure 2:
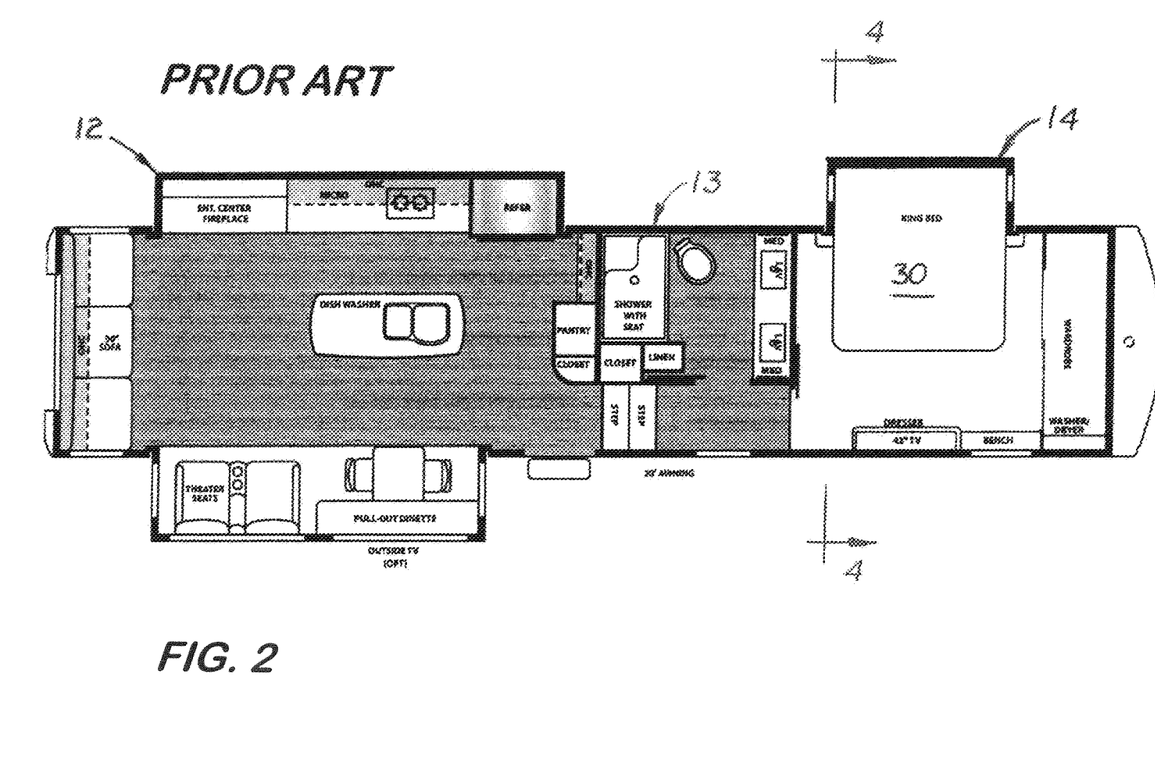
Figure 3:
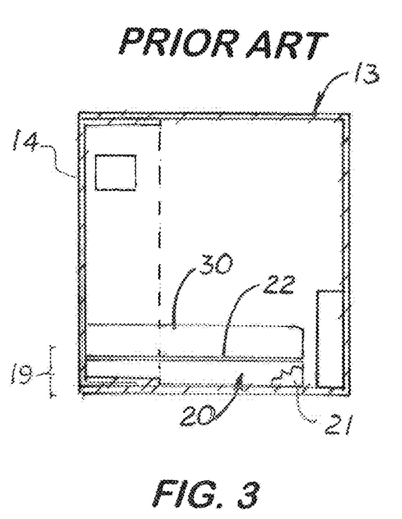
Figure 4:
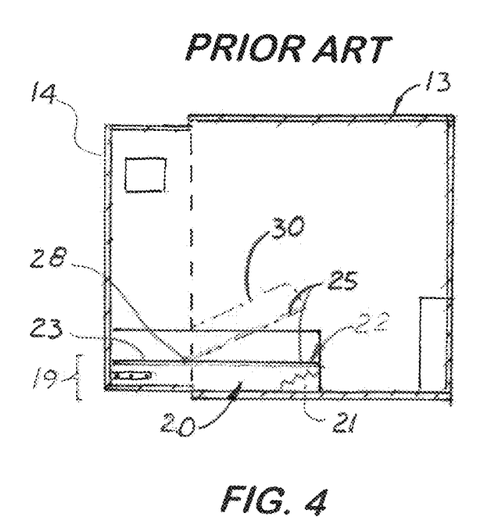

As more clearly shown in FIGS. 3 and 4, the mattress support system 19 is affixed to the slide-out 14 so that platform 20, primary deck 22, and mattress 30 all move transversely back and forth in the RV. The primary deck 22 is mounted over platform 20, creating a lower storage space 21 partially exposed to the outside air. The primary deck 22 includes a fixed deck section 23 and a lifting deck section 25. Hinge 28 is disposed between the two deck sections 23, 25, enabling a user to lift the outside edge of the lifting deck section 25 to access storage space 21 when standing inside the RV.

Because the slide-out 14 extends outward from the RV body 13 up to 30 inches, and because the width of the slide-out 14 is only slightly greater than the width of the mattress 30, minimal space is created between the inside walls of the slide-out 14 and the sides of the mattress. As a result, tucking bedding around the mattress 30 is difficult. Often, the bed is left unmade, which is annoying to some users.

Also, because the storage space 21 under the platform 20 is exposed to cold, moist, outside air, and mattress 30 rests directly on the fixed deck section 23 and the lifting deck section 25, moisture from the storage space 21 is absorbed by the mattress 30, creating mildew.

What is needed is a mattress deck accessory that can be used with an existing mattress support system 19 coupled to a moveable slide-out 14 that allows the user to temporarily slide the mattress 30 out of the slide-out 14, enabling the user to easily tuck bedding around the sides and head region of the mattress 30. What is also needed is an accessory that reduces mildew on the bottom surface of the mattress 30.

SUMMARY OF THE INVENTION

Disclosed herein is a sliding mattress accessory designed to be used with an existing mattress support system in an RV with a retractable slide-out. The mattress support system is affixed to the slide-out, and moves transversely back and forth from the RV.

The sliding mattress accessory is mounted over the existing mattress support system that enables the user to selectively move the mattress inward from the slide-out so that bedding can be more easily tucked around the head end and sides of the mattress. The accessory also elevates the mattress above the existing mattress support system so that moist air from the lower storage space does not contact the mattress and produce mildew.

The sliding mattress accessory includes a secondary deck, two long sliding rails, and at least one fixed deck support. The secondary deck is similar in size and shape to the existing primary deck and is aligned and registered over the primary deck. Like the primary deck, the secondary deck includes two planar sections—a short, fixed head section and a long deck section coupled together with a transversely aligned hinge that enables the long deck section to swing upward.

Each slide rail includes a sliding rail member and a fixed rail member mounted on the bottom surface of the long deck section and the top surface of the fixed head section. In the embodiment shown herein, the two sliding rail members are attached to the opposite sides of the secondary panel's long deck section, and the fixed rail members are attached to the primary deck's lifting deck section. It should be understood that the sliding rail members may be attached to the lifting deck section, and the fixed rails may be attached to the long deck section.

The fixed deck supports hold the secondary panel's fixed head section elevated over the primary deck's fixed deck section. When the secondary deck moves longitudinally over the primary deck, the fixed head section slides over the fixed deck support. The fixed head section is positioned over the fixed rail members attached to the lifting deck section on the primary deck. In the embodiment shown, the fixed deck support is made of two fixed supports mounted on the top surface of the fixed deck section.

The two sliding rails and the two fixed deck supports are the same height so the secondary deck is elevated horizontally, approximately 3 inches above the primary deck.

When assembled, the secondary platform is aligned and registered over the primary deck so that the head area of the mattress extends into the RV's slide-out.

The secondary deck is configured to move independently and longitudinally over the primary deck during use. When a mattress is placed on the secondary deck, the mattress moves inward independently from the slide-out, enabling the user to tuck bedding more easily around the head and sides of the mattress. A lock mechanism is provided that prevents the secondary deck from sliding longitudinally over the primary deck.

The user may simultaneously lift the long deck section on the secondary deck and the lift deck section on the primary deck to access the storage space inside the storage platform.

DESCRIPTION OF THE PREFERRED EMBODIMENT(S)

Shown in FIGS. 5-9 is a sliding mattress deck accessory 10 designed to be used with an existing mattress support system 20 coupled to an RV slide out as shown in FIGS. 1-4. The deck accessory 10 includes a secondary deck 40 designed to fit under and support a mattress 30. The secondary deck 40 includes a short, fixed head section 41 and a long, deck section 44 coupled with a hinge 47 that enables the opposite edge of the long deck section 44 to swing upward. When the free edge of the long deck section 44 is lifted, the user may lift the outer edge of the lower deck section 25 on the primary deck 22 to access storage space 21 inside platform 20.

Figure 5:
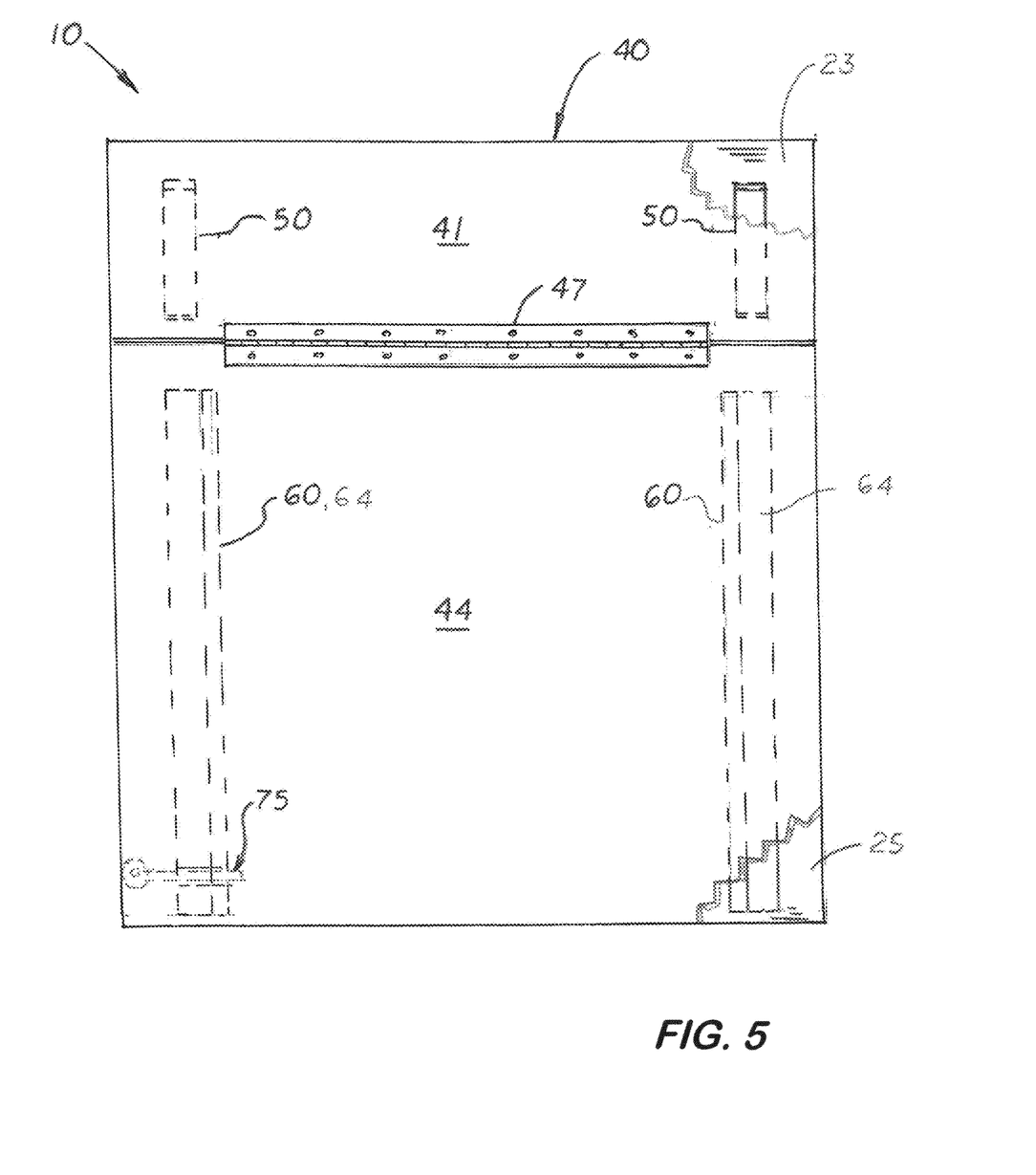
FIG. 5 is a top plan view of the secondary deck aligned and registered over the primary deck and showing the relative locations of the two fixed support rails and the two sliding rails.
Figure 6:
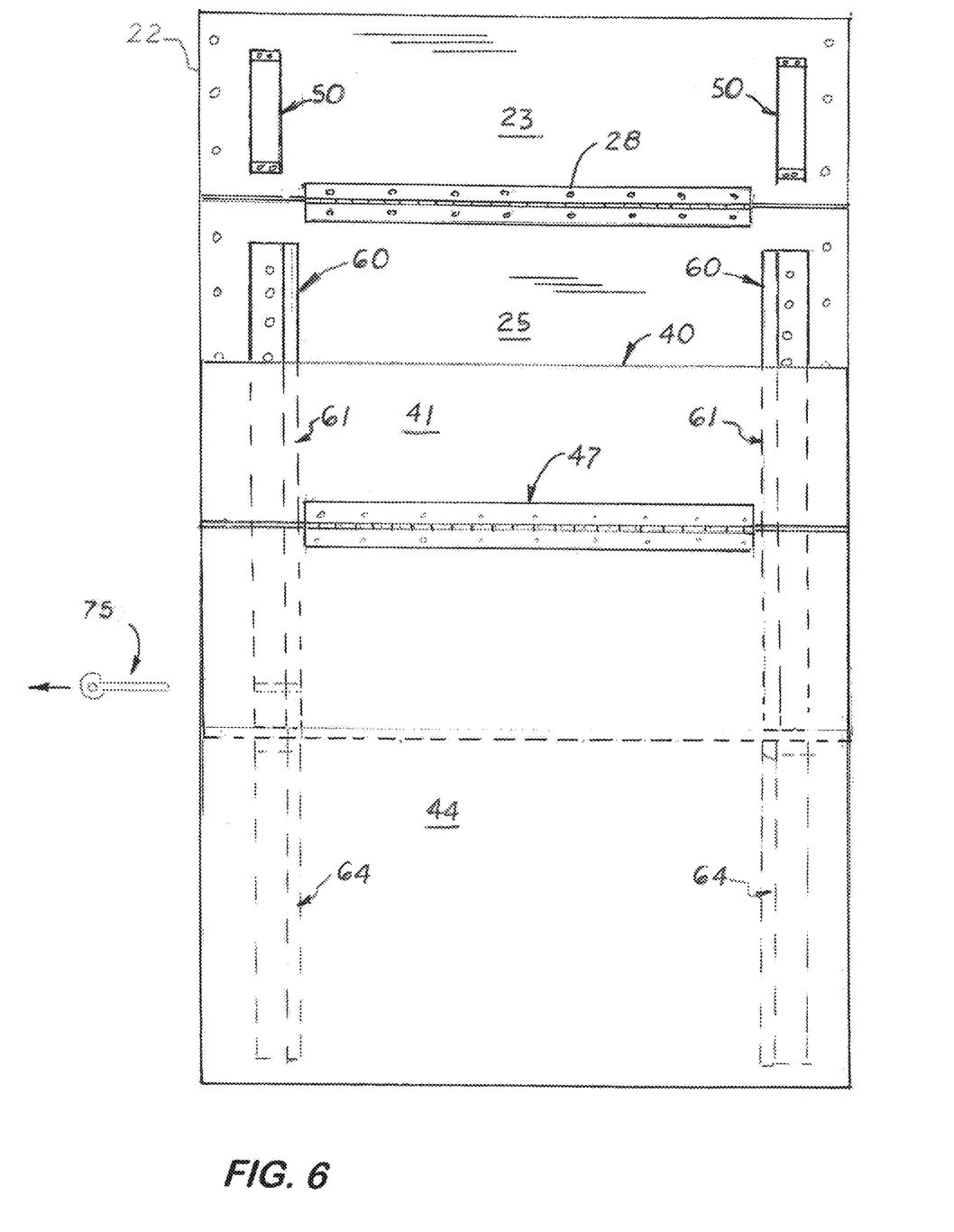
FIG. 6 is a top plan view of the secondary deck and the primary deck shown in FIG. 5 with the secondary deck sliding longitudinally over the primary deck.

The deck accessory 10 also includes two long sliding rails 60 longitudinally aligned and mounted to the bottom surface 45 of the long deck section 44 and the top surface of the lifting deck section 25. Mounted on the top surface of the fixed deck section 23 are two fixed deck supports 50.

Figure 7:
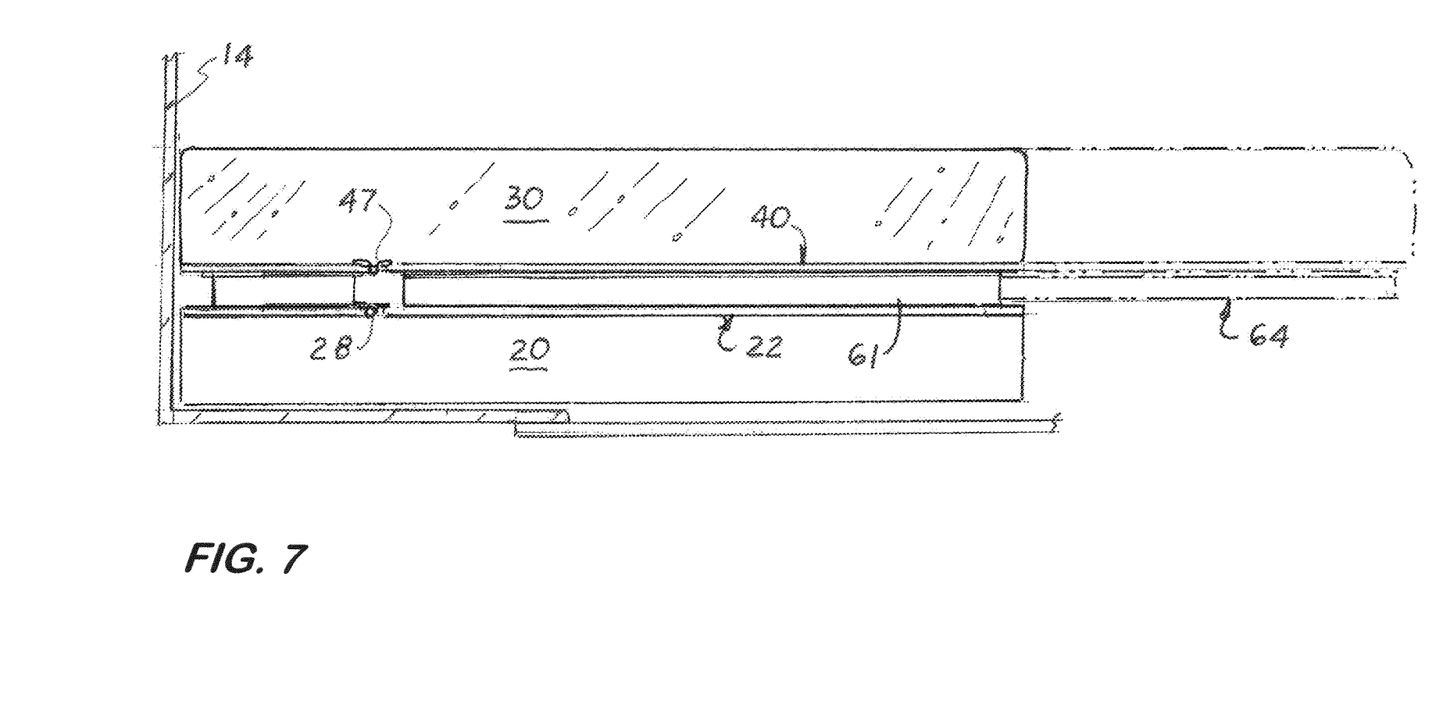
FIG. 7 is a side elevational view of the slide-out extended from the RV body and shows the relative position of the mattress when extended and retracted into the living space.
Figure 8:
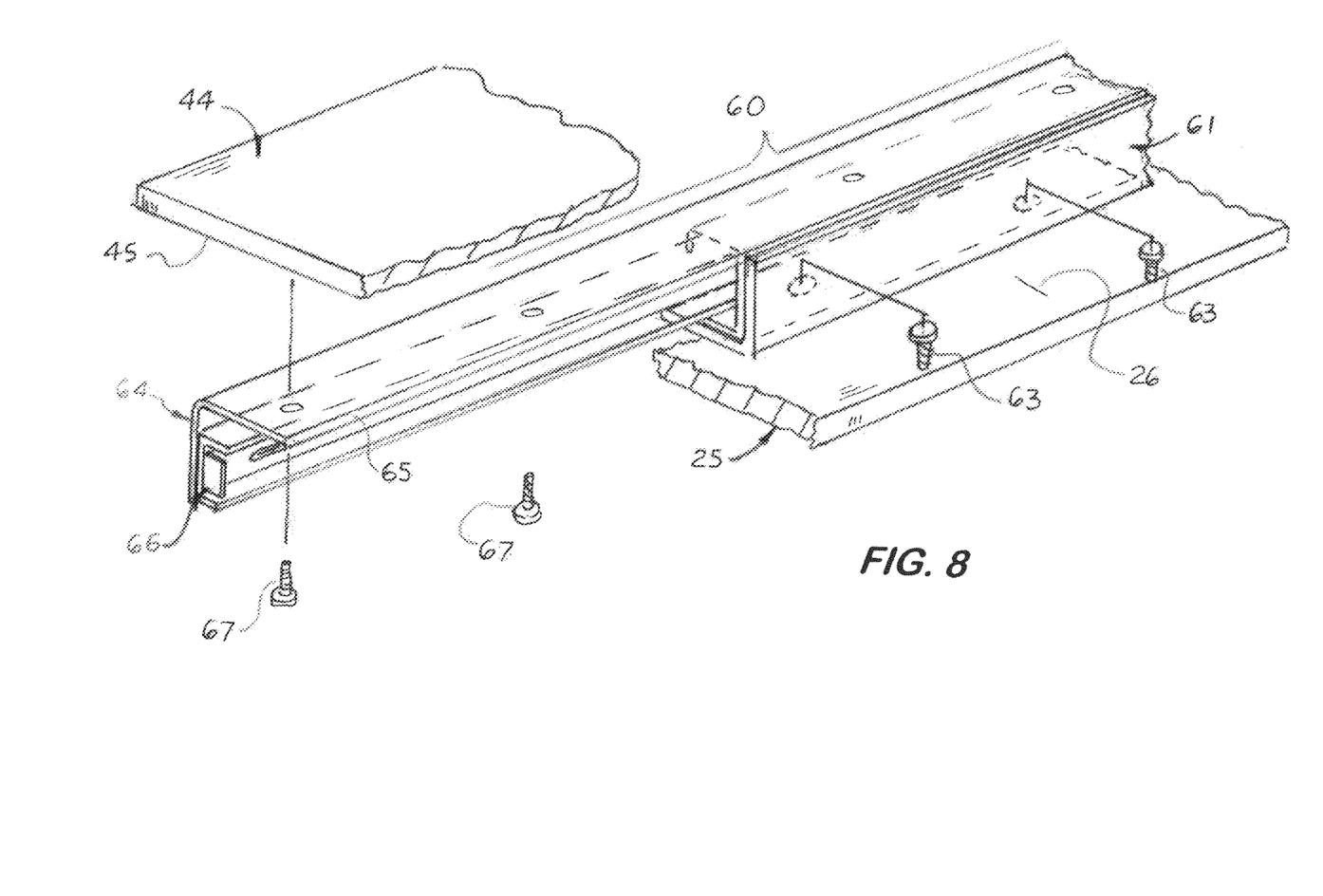
FIG. 8 is a perspective view of a sliding rail that includes a fixed rail member mounted on the top surface of the lifting deck section, and a sliding rail member mounted to the bottom surface of the long deck section.
Figure 9:
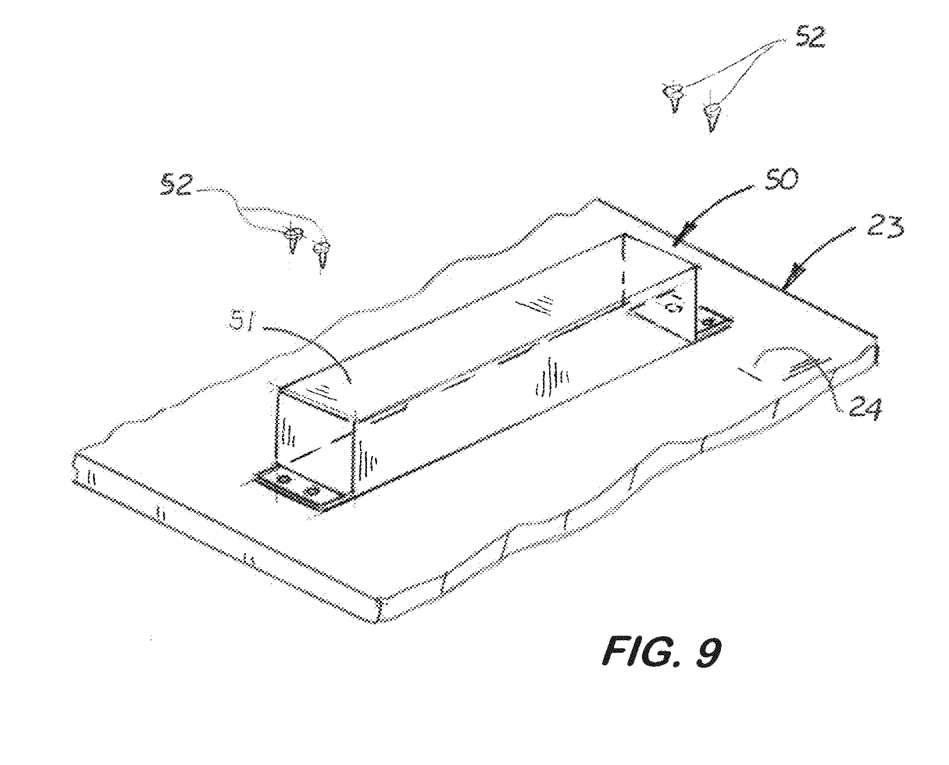
FIG. 9 is a perspective view of a fixed rail deck support mounted on the top surface of the fixed deck section.

As shown in FIGS. 7 and 8, each long sliding rail 60 includes a fixed rail member 61 and a sliding rail member 64. The fixed rail member 61 is an elongated, u-shaped tube mounted with connectors 63 to the top surface 26 of the lifting deck surface 25 on the primary deck 22. The sliding rail member 64 includes an L-shaped bracket 65 and a sliding arm 66 that engages the fixed rail member 61 and allows the bracket 65 to move longitudinally over the fixed rail member 61. Connectors 67 attach bracket 64 65 to the bottom surface 45 of the long deck section 44.

The fixed deck supports 50 hold the fixed head section 41 elevated over the primary deck's fixed deck section 23. When the secondary deck 40 moves longitudinally over the primary deck 22, the fixed head section 41 slides over the fixed deck supports 50. As the secondary deck 40 slides further, the fixed head section 41 eventually slides over the fixed rail members 61 attached to the top surface of the lifting deck section 25 on the primary deck 22. In the embodiment shown in FIG. 9, each fixed deck support 50 is an elongated tube 51 mounted via threaded connectors 52 to the top surface of the fixed deck section 23. It should be understood that the fixed deck support 50 is not limited to one or two elongated tubes 51, and other structures capable of supporting the fixed head section 41 may be used. The two sliding rails 60 and the two elongated tubes 51 are the same height in the preferred embodiment. The entire secondary deck 40 is elevated horizontally, approximately 3 inches above primary deck 22.

Because the long deck section 40 is connected to the moveable deck section 25, the user may simultaneously lift the long deck section 44 and the lifting deck section 25 to access the storage space 21 inside the storage platform 20.

An optional lock mechanism 75 is provided that prevents the secondary deck 40 from moving longitudinally over the primary deck 22. In one embodiment, the lock mechanism 75 is incorporated into the one or both slide rails 60. However, it should be understood that other types of lock mechanisms may be used.

When assembled, the secondary deck 40 is then aligned and registered over the primary deck 22, and a mattress 30 is placed over the top surface of the secondary deck 40. The lock mechanism 75 is locked during use to temporarily hold the secondary deck 40 and mattress 30 over the primary deck 22. When locked, the secondary platform 40 and mattress move back and forth with the movement of the slide-out 14. When desired, the lock mechanism 75 is unlocked, which allows the secondary deck 40 and the mattress 30 to slide longitudinally over the primary deck 22 and away from the slide-out 14 a sufficient distance over the primary deck 22 and out of the slide-out 14 so that the sides and head region of the mattress 30 may be comfortably reached and separated from the sides of the slide-out 14.

Because an air space 70 is formed between the primary deck 20 and the secondary deck 40 interior, warm, dry air can circulate over the top surface of the primary deck 20, reducing mildew.

In compliance with the statute, the invention described has been described in language more or less specific as to structural features. It should be understood however, that the invention is not limited to the specific features shown since the means and construction shown, comprises the preferred embodiments for putting the invention into effect. The invention is therefore claimed in its forms or modifications within the legitimate and valid scope of the amended claims, appropriately interpreted under the doctrine of equivalents.

I claim:

1. A sliding mattress accessory designed to be used with an mattress support system coupled to an RV slide-out, the mattress support system is affixed to the RV slide out and includes a storage platform that continuously extends into the RV slide-out when the RV slide-out extends and retracts from the RV, the storage platform includes a lower storage cavity and a primary deck that supports a mattress placed on top of the storage platform, the primary deck includes a fixed deck section and a lifting deck section that provides access to the storage cavity, the accessory comprises:

a. secondary deck longitudinally aligned over the primary deck, the secondary deck includes a fixed head section and a long deck section;

a hinge located between the fixed head section and the long deck section that enables the long deck section to pivot upward from the fixed head section;

at least two parallel long sliding rails longitudinally aligned and between the long deck section of the secondary deck and the lifting deck section on the primary deck, the two sliding rails connect the lifting deck section to the long deck section enabling the lifting deck section and long deck section to be simultaneously lifted to access the storage space, the two sliding rails also elevate the long deck section above the lifting deck section and also allow the long deck section to slide longitudinally over the lifting deck section, each sliding rail includes a fixed rail member attached to the lifting deck section and a sliding rail member attached to the long deck section, when the sliding rail member slides over the fixed rail member, the fixed rail member is partially exposed;

at least one fixed deck support mounted on the top surface of the fixed deck section on the primary deck, the fixed deck support configured to support the fixed head section at the same height elevation above the fixed deck section as the long deck section above the lifting deck section thereby allowing the fixed head section on-the entire secondary deck to slide axially over the fixed deck supports and onto the fixed rail member when the secondary deck slides over the primary deck; and a lock mechanism configured to selectively prevent the secondary deck from sliding longitudinally over the primary deck.

2. The accessory as recited in claim 1, wherein each sliding rail and fixed deck support elevate the secondary deck approximately 3 inches above the primary deck.

3. An RV sliding bed, comprising:
a. an RV slide-out that extends and retracts transversely from a side of an RV;
b. a platform located inside the RV, the platform includes one end that continuously extends into the RV slide-out and moves transversely inside the RV as the RV slide-out extends and retracts from the side of the RV, the platform includes a lower storage cavity;
c. a primary deck located over the platform that includes a fixed deck section that extends into the RV slide-out and a lifting deck section pivotally attached at one edge to the fixed deck section, the lifting deck section provides access to the lower storage cavity in the platform;
d. secondary deck longitudinally aligned over the primary deck, the secondary deck being approximately the same length and width as the primary deck and includes a fixed head section and a long deck section pivotally connected;
e. at least two parallel sliding rails longitudinally aligned and disposed between the lifting deck section on the primary deck and the long deck section on the secondary deck, the two sliding rails elevate the long deck section above the lifting deck section and enable the long deck section to slide over the lifting deck section, each sliding rail includes a fixed rail member attached to the lifting deck section and a sliding rail member attached to the long deck section, when the sliding rail member slides over the fixed rail member, the fixed rail member is partially exposed;
f. at least two fixed deck supports attached to the fixed deck section on the primary deck, the two fixed deck supports configured to support the fixed head section of the secondary deck at the same elevated above the fixed deck section position as the sliding rails support the long deck section on the secondary deck over the lifting deck section on the primary deck, the fixed deck supports being detached from the fixed head section enabling the fixed head section to slide over the fixed deck supports and onto the fixed rail members when the long deck section slides longitudinally over the lifting deck section; and
g. a lock mechanism configured to selectively prevent the secondary deck from sliding longitudinally over the primary deck.

\* \* \* \* \*